United States Patent
Chandramouli et al.

(10) Patent No.: US 11,121,801 B2
(45) Date of Patent: Sep. 14, 2021

(54) METHOD AND APPARATUS FOR REDUNDANCY IMPROVEMENT IN A COMMUNICATION SYSTEM

(71) Applicant: Nokia Technologies Oy, Espoo (FI)

(72) Inventors: Devaki Chandramouli, Plano, TX (US); Laurent Thiebaut, Antony (FR); Nicolas Drevon, Paris (FR); Yannick Lair, Voisins le Bretonneux (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/834,980

(22) Filed: Mar. 30, 2020

(65) Prior Publication Data

US 2020/0313794 A1 Oct. 1, 2020

Related U.S. Application Data

(60) Provisional application No. 62/827,652, filed on Apr. 1, 2019.

(51) Int. Cl.
*H04W 76/15* (2018.01)
*H04L 1/00* (2006.01)
*H04L 12/707* (2013.01)

(52) U.S. Cl.
CPC .......... *H04L 1/0025* (2013.01); *H04L 1/0017* (2013.01); *H04L 1/0031* (2013.01); *H04L 45/24* (2013.01); *H04W 76/15* (2018.02)

(58) Field of Classification Search
CPC ... H04L 1/0017; H04L 1/0025; H04L 1/0031; H04L 45/24; H04W 76/15; H04W 76/34
See application file for complete search history.

(56) References Cited

U.S. PATENT DOCUMENTS

2012/0076129 A1* 3/2012 Free ................... H04L 41/5054
370/352
2017/0366618 A1 12/2017 Vrzic et al.
(Continued)

FOREIGN PATENT DOCUMENTS

KR  20180081446 A  7/2018
WO  2020/091449  *  5/2020

OTHER PUBLICATIONS

International Search Report and Written Opinion received for corresponding Patent Cooperation Treaty Application No. PCT/EP2020/058889, dated Jun. 10, 2020, 12 pages.
(Continued)

*Primary Examiner* — Gary Mui
(74) *Attorney, Agent, or Firm* — Alston & Bird LLP

(57) ABSTRACT

A method, apparatus and computer program product receive a traffic redundancy indication from a user equipment in a communication network or from a policy controller. The method, apparatus and computer program product determine whether traffic redundancy is needed for the radio access network and the user plane function based on the traffic redundancy indication. The method, apparatus and computer program product request the radio access network to not establish redundancy mechanisms in a circumstance where traffic redundancy is not needed for the radio access network. The method, apparatus and computer program product request the user plane function to not establish redundancy mechanisms in a circumstance where traffic redundancy is not needed for the user plane function.

18 Claims, 5 Drawing Sheets

(56) References Cited

U.S. PATENT DOCUMENTS

| | | | |
|---|---|---|---|
| 2018/0199315 A1 | 7/2018 | Hong et al. | |
| 2018/0367288 A1* | 12/2018 | Vrzic | H04W 36/0069 |
| 2019/0356601 A1* | 11/2019 | Kweon | H04L 47/32 |
| 2020/0084663 A1* | 3/2020 | Park | H04W 28/06 |
| 2020/0107213 A1* | 4/2020 | Park | H04L 12/1407 |
| 2020/0162366 A1* | 5/2020 | Vrzic | H04L 1/08 |
| 2020/0351969 A1* | 11/2020 | Miklos | H04W 76/15 |

OTHER PUBLICATIONS

"3rd Generation Partnership Project; Technical Specification Group Services and System Aspects; Study on enhancement of Ultra-Reliable Low-Latency Communication (URLLC) support in the 5G Core network (5GC) (Release 16)", 3GPP TR 23.725, V16.1.0, Mar. 2019, pp. 1-91.

"3rd Generation Partnership Project; Technical Specification Group Services and System Aspects; System Architecture for the 5G System (5GS); Stage 2 (Release 15)", 3GPP TS 23.501, V15.5.0, Mar. 2019, pp. 1-241.

"3rd Generation Partnership Project; Technical Specification Group Services and System Aspects; Procedures for the 5G System; Stage 2 (Release 15)", 3GPP TS 23.502, V15.5.0, Mar. 2019, pp. 1-355.

"5G URLLC: Optimizing Redundancy", 3GPP TSG-SA WG2 Meeting #133, S2-1906521, May 13-17, 2019, pp. 1-7.

* cited by examiner

METHOD AND APPARATUS FOR REDUNDANCY IMPROVEMENT IN A COMMUNICATION SYSTEM

CROSS-REFERENCE TO RELATED APPLICATION

This patent application claims priority from U.S. Provisional Patent Application Ser. No. 62/827,652, titled "METHOD AND APPARATUS FOR REDUNDANCY IMPROVEMENT IN A COMMUNICATION SYSTEM," filed Apr. 1, 2019, which is incorporated herein by reference in its entirety.

TECHNICAL FIELD

An example embodiment of the present disclosure generally relates to redundancy improvement in a communication system, such as a fifth generation (5G) system.

BACKGROUND 5G communication systems aim to support Ultra-Reliable Low-Latency Communication (URLLC). In order to ensure high reliability of transmission, redundant transmission of user data is supported in communication systems such as a 5G system. The key points in supporting redundant transmission of user data in communication systems such as a 5G system include: how to make a decision on enabling redundant transmission or not for a specific quality of service (QoS) flow, how to replicate the data packets in user equipment (UE)/radio access network (RAN)/user plane function (UPF), when redundancy is needed or the like. However, a number of deficiencies and issues associated with supporting redundant transmission of user data in communication systems remain.

BRIEF SUMMARY

A method, apparatus and computer program product are provided in accordance with an example embodiment to improve, such as to optimize, redundancy in a communication system, such as a fifth generation (5G) system.

In one example embodiment, a method is provided that includes receiving a traffic redundancy indication from a user equipment in a communication network or from a policy controller. The method further includes determining whether traffic redundancy is needed for the radio access network and the user plane function based on the traffic redundancy indication. The method further includes requesting the radio access network to not establish redundancy mechanisms in a circumstance where traffic redundancy is not needed for the radio access network. The method further includes requesting the user plane function to not establish redundancy mechanisms in a circumstance where traffic redundancy is not needed for the user plane function.

In some implementations of such a method, the traffic redundancy indication is part of the protocol data unit session establishment request received from the user equipment. In some embodiments, the traffic redundancy indication is part of a protocol data unit session modification request from the user equipment. In some embodiments, the traffic redundancy indication targets the whole traffic within a protocol data unit session. In some embodiments, the traffic redundancy indication targets a subset of the traffic within a protocol data unit session. In some embodiments, the radio access network is configured on a per protocol data unit session basis by a Core Network to determine not to perform redundant transmission at: a Packet Data Convergence Protocol level, a general packet radio service tunneling protocol user data tunneling level, or a transport level. In some embodiments, such as in embodiment in which the tunnels are general packet radio service tunneling protocol user data tunnels or transport level tunnels, the user plane function is configured on a per protocol data unit session basis by a Session Manager of the Core Network to determine not to use redundant tunnels.

In another example embodiment, an apparatus is provided that includes processing circuitry and at least one memory including computer program code for one or more programs with the at least one memory and the computer program code configured to, with the processing circuitry, cause the apparatus at least to receive a traffic redundancy indication from a user equipment in a communication network or from a policy controller. The computer program code is further configured to, with the at least one processor, cause the apparatus to determine whether traffic redundancy is needed for the radio access network and the user plane function based on the traffic redundancy indication. The computer program code is further configured to, with the at least one processor, cause the apparatus to request the radio access network to not establish redundancy mechanisms in a circumstance where traffic redundancy is not needed for the radio access network. The computer program code is further configured to, with the at least one processor, cause the apparatus to request the user plane function to not establish redundancy mechanisms in a circumstance where traffic redundancy is not needed for the user plane function.

In some implementations of such an apparatus, the traffic redundancy indication is part of the protocol data unit session establishment request received from the user equipment. In some embodiments, the traffic redundancy indication is part of a protocol data unit session modification request from the user equipment. In some embodiments, the traffic redundancy indication targets the whole traffic within a protocol data unit session. In some embodiments, the traffic redundancy indication targets a subset of the traffic within a protocol data unit session. In some embodiments, the radio access network is configured on a per protocol data unit session basis by a Core Network to determine not to perform redundant transmission at: a Packet Data Convergence Protocol level, a general packet radio service tunneling protocol user data tunneling level, or a transport level. In some embodiments, such as in embodiment in which the tunnels are general packet radio service tunneling protocol user data tunnels or transport level tunnels, the user plane function is configured on a per protocol data unit session basis by a Session Manager of the Core Network to determine not to use redundant tunnels.

In another example embodiment, a computer program product is provided that includes at least one non-transitory computer-readable storage medium having computer executable program code instructions stored therein with the computer executable program code instructions comprising program code instructions configured, upon execution, to receive a traffic redundancy indication from a user equipment in a communication network or from a policy controller. The computer executable program code instructions comprise program code instructions that are further configured, upon execution, to determine whether traffic redundancy is needed for the radio access network and the user plane function based on the traffic redundancy indication. The computer executable program code instructions comprise program code instructions further configured, upon execution, to request the radio access network to not establish redundancy mechanisms in a circumstance where traffic redundancy is not needed for the radio access network. The computer executable program code instructions comprise program code instructions that are further configured, upon execution, to request the user plane function to not establish redundancy mechanisms in a circumstance where traffic redundancy is not needed for the user plane function.

In some implementations of such a computer program product, the traffic redundancy indication is part of the protocol data unit session establishment request received from the user equipment. In some embodiments, the traffic redundancy indication is part of a protocol data unit session modification request from the user equipment. In some embodiments, the traffic redundancy indication targets the whole traffic within a protocol data unit session. In some embodiments, the traffic redundancy indication targets a subset of the traffic within a protocol data unit session. In some embodiments, the radio access network is configured on a per protocol data unit session basis by a Core Network to determine not to perform redundant transmission at: a Packet Data Convergence Protocol level, a general packet radio service tunneling protocol user data tunneling level, or a transport level. In some embodiments, such as in embodiment in which the tunnels are general packet radio service tunneling protocol user data tunnels or transport level tunnels, the user plane function is configured on a per protocol data unit session basis by a Session Manager of the Core Network to determine not to use redundant tunnels.

In another example embodiment, an apparatus is provided that includes means for receiving a traffic redundancy indication from a user equipment in a communication network or from a policy controller. The apparatus further includes means for determining whether traffic redundancy is needed for the radio access network and the user plane function based on the traffic redundancy indication. The apparatus further includes means for requesting the radio access network to not establish redundancy mechanisms in a circumstance where traffic redundancy is not needed for the radio access network. The apparatus further includes means for requesting the user plane function to not establish redundancy mechanisms in a circumstance where traffic redundancy is not needed for the user plane function.

In some implementations of such an apparatus, the traffic redundancy indication is part of the protocol data unit session establishment request received from the user equipment. In some embodiments, the traffic redundancy indication is part of a protocol data unit session modification request from the user equipment. In some embodiments, the traffic redundancy indication targets the whole traffic within a protocol data unit session. In some embodiments, the traffic redundancy indication targets a subset of the traffic within a protocol data unit session. In some embodiments, the radio access network is configured on a per protocol data unit session basis by a Core Network to determine not to perform redundant transmission at: a Packet Data Convergence Protocol level, a general packet radio service tunneling protocol user data tunneling level, or a transport level. In some embodiments, such as in embodiment in which the tunnels are general packet radio service tunneling protocol user data tunnels or transport level tunnels, the user plane function is configured on a per protocol data unit session basis by a Session Manager of the Core Network to determine not to use redundant tunnels.

BRIEF DESCRIPTION OF THE DRAWINGS

Figure 1:
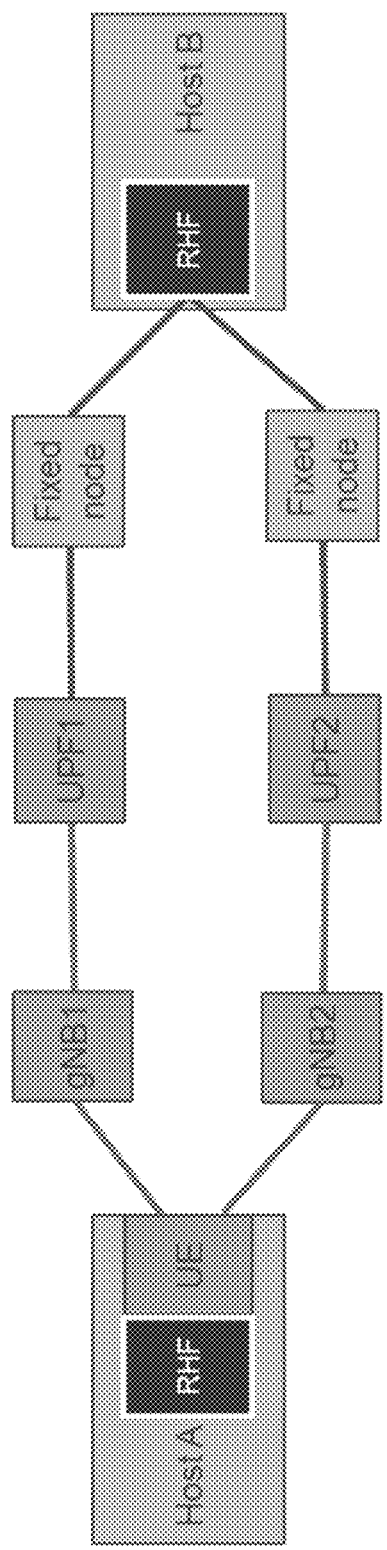
Figure 2:
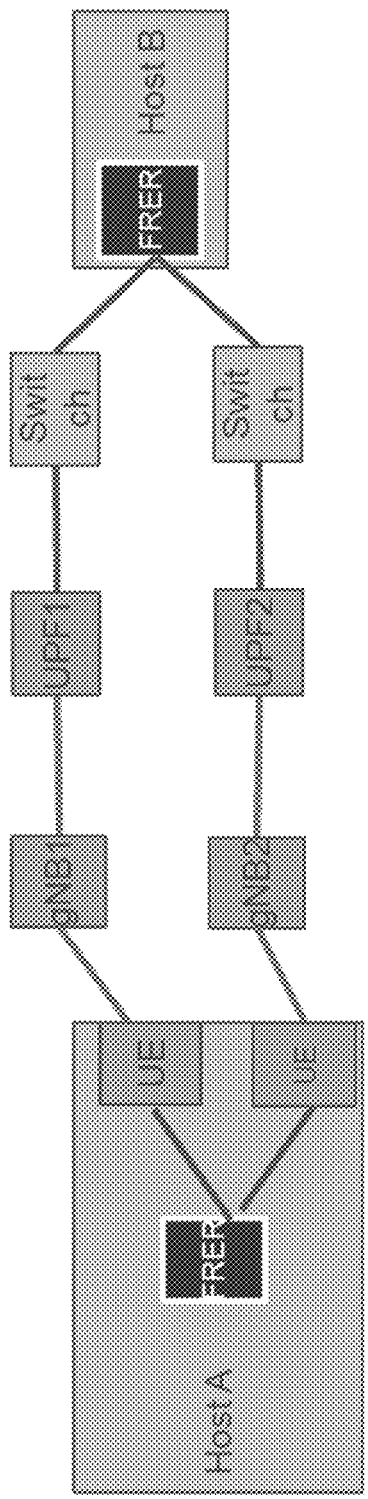
Figure 3:
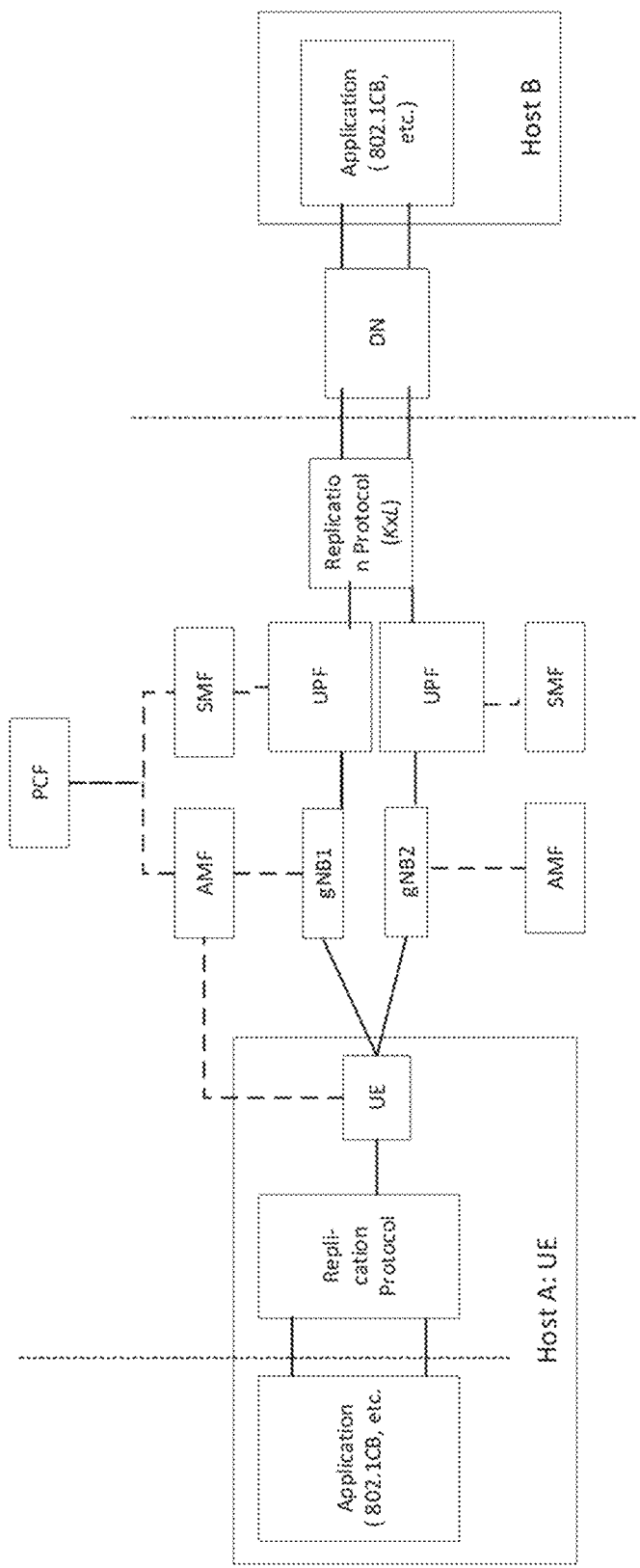
Figure 4:
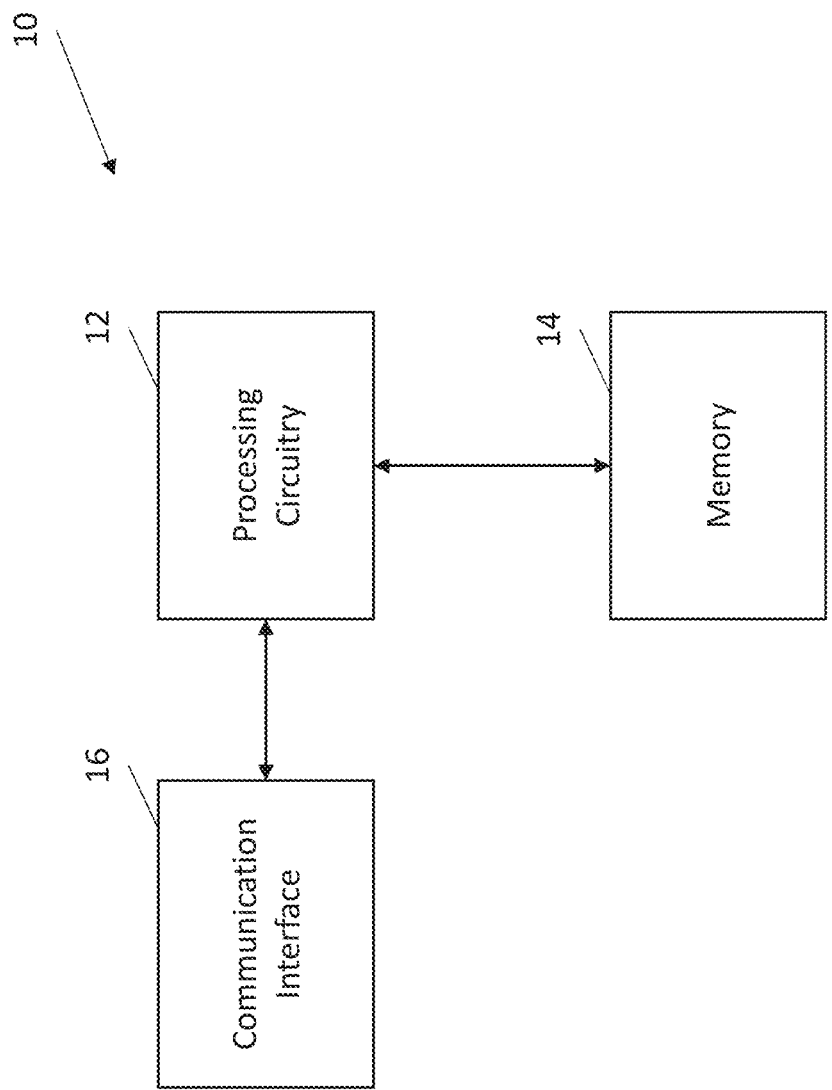
Figure 5:
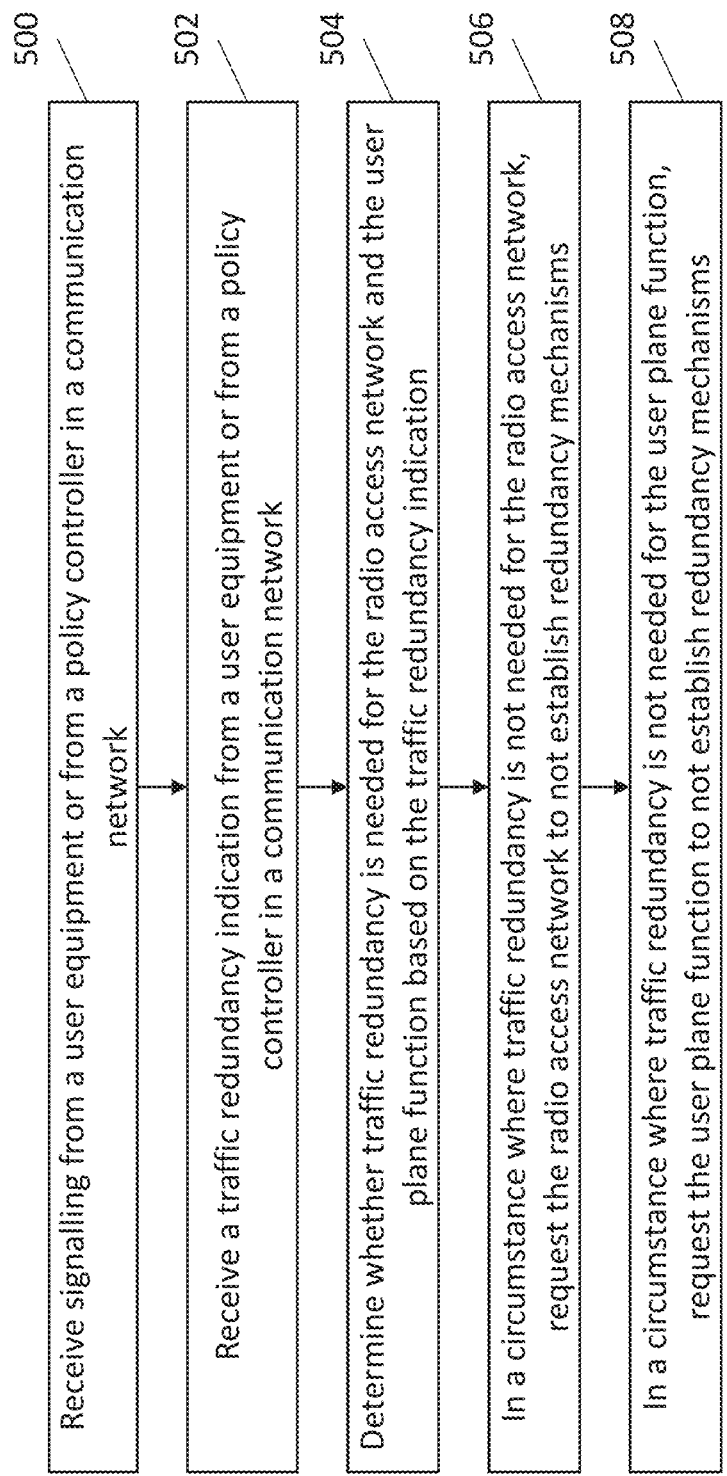

Having thus described certain example embodiments of the present disclosure in general terms, reference will hereinafter be made to the accompanying drawings, which are not necessarily drawn to scale, and wherein:

FIG. 1 illustrates an example configuration to handle redundant protocol data unit sessions in a communication system;

FIG. 2 illustrates another example configuration to handle redundant protocol data unit sessions in a communication system;

FIG. 3 illustrates another example configuration to handle redundant protocol data unit sessions in a communication system;

FIG. 4 is a block diagram of an apparatus that may be specifically configured in accordance with an example embodiment of the present disclosure; and FIG. 5 is a flowchart illustrating a set of operations performed, such as by the apparatus of FIG. 4, in accordance with an example embodiment of the present disclosure.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

5G communication systems aim to support Ultra-Reliable Low-Latency Communication (URLLC). The $3^{rd}$ Generation Partnership Project (3GPP) technical report (TR) 23.725 included a number of proposed solutions for supporting redundant transmission.

The first configuration illustrated in FIG. 1 operates by providing redundant user plane paths based on dual connectivity. The first configuration will enable a terminal device to set up two redundant protocol data unit (PDU) Sessions over the 5G network, so that the network will attempt to make the paths of the two redundant PDU sessions independent whenever that is possible. It is possible to rely on upper layer protocols, such as the Institute of Electrical and Electronics Engineers (IEEE) TSN (Time Sensitive Networking) FRER (Frame Replication and Elimination for Reliability), to manage the replication and elimination of redundant packets/frames over the duplicate paths which can span both the 3GPP segments and possibly fixed network segments as well.

As illustrated in FIG. 1, the 3GPP network provides two paths from the device: the first PDU Session spans from the user equipment (UE) via next generation Node B (gNB)1 to user plane function (UPF)1 acting as the PDU Session Anchor, and the second PDU Session spans from the UE via gNB2 to UPF2 acting as the PDU Session Anchor. Based on these two independent PDU Sessions, two independent paths are set up, which may span even beyond the 3GPP network. In the example shown in the FIG. 1, two paths are set up between Host A in the device and Host B, with some (optional) fixed intermediate nodes. In order to enable such a configuration, the following features are supported (one or more of which may be applicable to other solutions, methods, apparatuses, and computer program products disclosed herein):

RAN supports dual connectivity, and RAN coverage is sufficient for dual connectivity in the target area (e.g., it is possible for UE to connect to at least two independent gNBs using dual connectivity, for example, by operating the gNBs in different frequencies).

UEs support dual connectivity.

The core network UPF deployment is aligned with RAN deployment and supports redundant user plane paths.

The underlying transport topology is aligned with the RAN and UPF deployment and supports redundant user plane paths.

The physical network topology and geographical distribution of functions also supports the redundant user plane paths to the extent deemed necessary by the operator.

The operation of the redundant user plane paths is made sufficiently independent, to the extent deemed necessary by the operator, e.g., independent power supplies.

Another configuration proposed is illustrated in FIG. 2; the configuration illustrated in FIG. 2 deploys at least two UEs on one single device and generally operates these UEs as independent UEs. This solution will enable a terminal device to set up multiple redundant PDU Sessions over the 5G network, so that the network will attempt to make the paths of the multiple redundant PDU sessions independent whenever that is possible. It is possible to rely on upper layer protocols, such as the IEEE TSN (Time Sensitive Networking), to manage the replication and elimination of redundant packets/frames over the multiple paths which can span both the 3GPP segments and possibly fixed network segments as well.

As illustrated in FIG. 2, the first PDU Session spans from the UE1 via gNB1 to UPF1, while the second PDU Session spans from the UE2 via gNB2 to UPF2. Based on these two independent PDU Sessions, two independent paths are set up, which may span even beyond the 3GPP network. This solution makes use of the integration of multiple UEs into the device, and assumes a RAN deployment where redundant coverage by multiple gNBs is generally available.

Multiple PDU Sessions are set up from the UEs, which use independent RAN (gNB) and core network (CN) (such as UPF) entities. For example, two UEs, UE1 and UE2 are connected to gNB1 and gNB2, respectively. UE1 sets up a PDU Session via gNB1 to UPF1, and UE2 sets up a PDU Session via gNB2 to UPF2. UPF1 and UPF2 connect to the same Data Network (DN), even though the traffic via UPF1 and UPF2 might be routed via different user plane nodes within the DN. UPF1 and UPF2 are controlled by session management functions (SMF) SMF1 and SMF2, respectively.

In order to enable such a configuration, the following features are supported (one or more of which may be applicable to other solutions, methods, apparatuses, and computer program products disclosed herein):

Terminal devices integrate multiple UEs which can connect to different gNBs independently.

RAN coverage is redundant in the target area: it is possible to connect to multiple gNBs from the same location. To ensure that the two UEs connect to different gNBs, the gNBs operate such that the selection of gNBs can be distinct from each other (e.g., gNB s operating in different frequencies, etc.).

The core network UPF deployment is aligned with RAN deployment and supports redundant user plane paths.

The underlying transport topology is aligned with the RAN and UPF deployment and supports redundant user plane paths.

The physical network topology and geographical distribution of functions also supports the redundant user plane paths to the extent deemed necessary by the operator.

The operation of the redundant user plane paths is made sufficiently independent, to the extent deemed necessary by the operator, e.g., independent power supplies.

Both of these proposed configurations involve setting up two disjoint redundant user plane paths in a 5G system either from one UE or two UEs for support of high reliability. The setup of two or more redundant paths is rather static for 5G system when a UE requests the different PDU sessions setup. A 5G system does not have much flexibility on handling of these two redundant PDU sessions in proposed solution #1 and #2. However, such static and blind support of the redundant PDU sessions by a 5G system may not always provide high reliability as expected. For instance, the data replication into two or more PDU sessions may further increase the load of the radio access network (RAN) and thus introduce more radio interference, which in turn may negatively impact the data transmission reliability over the radio links and hence impact the end-to-end reliability. On the other hand, the static and blind support of redundant user plane paths for high reliability may also introduce unnecessary usage of network resources if one PDU session is sufficient to provide the required QoS. In such case, a 5G system, from the perspectives of network resource utilization and network performance, should prefer to serve the end-to-end (E2E) duplication for the UE with one PDU session while not impacting higher layer duplication required by an application.

Another configuration proposed in the TR 23.725 and illustrated in FIG. 3 introduced replicator functions to guide the lower layers to ensure their corresponding latency/availability/reliability requirements are fulfilled. This configuration introduces a replicator that allows the 5G system to be aware (e.g., detect or have explicit information) that two or more "streams" of replicated packets belong together, and guide the lower layers to ensure these packets get an optimized treatment in the 5G system depending on whether the streams are terminated in a single UE or by two different UEs that belong together within the same host. Another configuration proposed in the TR 23.725 introduced Dual GTP-U tunnel for a single PDU Session where the network (5G RAN and UPF controlled by the SMF) duplicates data transmitted in order to ensure reliability.

One issue related to all of the configurations proposed above is that the network, in certain cases, tends to duplicate the data traffic even though the application may have already transmitted the data traffic redundantly. If the application transmits the traffic redundantly and the network carries out traffic replication, then the UE ends up receiving the same packet at least 4 times. This would lead to significant radio and network resources being wasted for the same packet. Thus, a solution is needed to manage the replication mechanisms based on expected application behaviour. A solution proposed in TR 23.725 tries to address this issue by introducing a replication framework. The replication framework includes a replicator functionality that detects multiple related flows, and whether they are utilized for redundant packets, of incoming internet protocol (IP)/Ethernet flows at the transmitter side. The replication framework can replicate the packets towards the lower layers based on the application requirement to support lowest latency and the need to support replication within 5G System (within the domain of a 3GPP system). The replication framework can also eliminate further replication and can, instead, transmit the packet stream just once towards the lower layers based on an application functionality that supports redundancy by default. However, such a solution has two major issues that cannot be easily resolved. First, it relies on the replication framework to have information regarding the traffic and the expected packet format for applications that are transmitting redundantly. This requirement would not be easy for all of the applications to satisfy unless the format is well defined and known to the replication framework. However, the packet format may not be well defined in many cases. Second, such a solution relies on support of an additional protocol layer in the UE and UPF/replicator which may not be supported due to potential complexities. In addition, the network may not be able to detect such application layer protocol (e.g., when the application flows are ciphered at application level). Therefore, an alternative solution is desired.

Aiming to provide an alternative solution for redundancy optimization, a method, apparatus and computer program product are provided in accordance with an example embodiment. On a high-level, some embodiments of the method, apparatus and computer program product are based on introducing a technique for an application/UE to indicate to the network (e.g., the SMF) that a UE would apply traffic redundancy at PDU Session level (traffic redundancy indication at the PDU Session level) in a communications system, such as a 5G system. The UE may opt to only apply redundancy for a certain application or for a certain traffic flow (e.g., 5-tuple) for a PDU Session, in which case the UE indicates to the network (e.g., SMF) it already applies traffic redundancy at Application/Traffic Flow level. The UE can provide the traffic redundancy indication within a PDU Session establishment or a PDU Session modification request. As an alternative method, the packet control function (PCF) or the SMF itself can be configured with the indication that redundant transmission is performed at the UE level (traffic redundancy indication) for 1) a given PDU Session (which may identified by Data Network Name (DNN) or Single Network Slice Selection Assistance Information (S-NSSAI)), or for 2) a set of applications or traffic flow(s) within a PDU Session. Information derived by the SMF from PCF policies and/or local SMF configuration and/or the UE indication within the PDU Session Establishment/Modification request can be provided to the RAN and UPF as, by way of example, URLLC assistance information.

FIG. 4 illustrates an example apparatus that may be provided to embody the various components in a communication system, for example, a portion of a core network, e.g., a gNB, a RAN, or the like. As illustrated in FIG. 4, the apparatus 10 of an example embodiment includes, is associated with or is otherwise in communication with processing circuitry 12, a memory 14, and a communication interface 16.

The processing circuitry 12 (and/or co-processors or any other circuitry assisting or otherwise associated with the processor) may be in communication with the memory device 14 via a bus for passing information among components of the apparatus 10. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 10 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processing circuitry 12 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processor may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 12 may be configured to execute instructions stored in the memory device 14 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processing circuitry to perform the algorithms and/or operations described herein when the instructions are executed. However, in some cases, the processing circuitry may be a processor of a specific device (e.g., an image processing system) configured to employ an embodiment of the present disclosure by further configuration of the processor by instructions for performing the algorithms and/or operations described herein. The processing circuitry may include, among other things, a clock, an arithmetic logic unit (ALU) and logic gates configured to support operation of the processor.

The communication interface 16 may be any means such as a device or circuitry embodied in either hardware or a combination of hardware and software that is configured to receive and/or transmit data from/to a network. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Referring now to FIG. 5 the operations performed by a component of the communication system, such as a core network, in particular, a session management function in a core network, which may be embodied by the apparatus illustrated in FIG. 4 in accordance with an example embodiment are illustrated.

As shown in block 500, the apparatus of the core network includes means, such as the communication interface 16 and/or the processing circuitry 12, for receiving signalling from a user equipment or from a policy controller in a communication network.

As shown in block 502, the apparatus of the core network includes means, such as the communication interface 16 and/or the processing circuitry 12, for receiving a traffic redundancy indication from the user equipment or from a policy controller in a communication network. In some embodiments, the traffic redundancy indication is part of a protocol data unit session establishment request. In some embodiments, the traffic redundancy indication is part of a protocol data unit session modification request transmitted after the protocol data unit session establishment request. In various embodiments, the traffic redundancy indication may be provided at an application level, at a traffic flow level, or at a PDU session level in non-access stratum signalling, by way of example, in PDU session related signalling. In other embodiments the traffic redundancy indication is received from a policy controller (PCF) in PDU Session related policy information (in which case the traffic redundancy indication applies to the whole PDU Session) or in a policy and charging control (PCC) rule (in which case it applies only to the traffic identified by the PCC rule). In some embodiments, the traffic redundancy indication targets the whole traffic, i.e., all data to be transmitted in the traffic. In some embodiments, the traffic redundancy indication targets a subset of the traffic.

As shown in block 504, the apparatus of the core network includes means, such as the processing circuitry 12, for determining whether traffic redundancy is needed for the radio access network and the user plane function based on the traffic redundancy indication. For example, in some embodiments, if the traffic redundancy indication indicates that the user equipment will apply redundancy at a PDU Session level, the apparatus may determine that redundancy at the radio access network level or at the communication level between the user plane function and the radio access network are not needed for one or both of the radio access network and the user plane function.

As shown in block 506, the apparatus of the core network includes means, such as the communication interface 16 and/or the processing circuitry 12, for requesting the radio access network to not establish traffic redundancy (e.g., not to establish traffic replication and transmission over different data paths) in a circumstance where traffic redundancy is not needed for the radio access network. In some embodiments, the radio access network is configured on a per protocol data unit session basis by a Core Network to determine not to perform redundant transmission at: a Packet Data Convergence Protocol level, a general packet radio service tunneling protocol user data tunneling level, or a transport level.

As shown in block 508, the apparatus of the core network includes means, such as the communication interface 16 and/or the processing circuitry 12, for requesting the user plane function to not establish traffic redundancy (e.g., not to establish traffic replication and transmission over different data paths) in a circumstance where traffic redundancy is not needed for the user plane function. In some embodiments, the user plane function is configured on a per protocol data unit session basis by a Session Manager of the Core Network to determine not to use redundant tunnels, and wherein the tunnels are general packet radio service tunneling protocol user data tunnels or transport level tunnels.

As described above, FIG. 5 includes flowchart of an apparatus 10, method, and computer program product according to certain example embodiments. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present invention and executed by processing circuitry 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowchart of FIG. 2. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving a traffic redundancy indication from a user equipment in a communication network or from a policy controller, wherein the traffic redundancy indication targets a subset of traffic within a protocol data unit session;
   determining whether traffic redundancy is needed for a radio access network and a user plane function based on the traffic redundancy indication; and
   in a circumstance where traffic redundancy is not needed for the radio access network, requesting the radio access network to not establish redundancy mechanisms.

2. The method according to claim 1, wherein the traffic redundancy indication is part of the protocol data unit session establishment request received from the user equipment.

3. The method according to claim 1, wherein the traffic redundancy indication is part of a protocol data unit session modification request from the user equipment.

4. The method according to claim 1, wherein the radio access network is configured on a per protocol data unit session basis by a Core Network to determine not to perform redundant transmission at: a Packet Data Convergence Protocol level, a general packet radio service tunneling protocol user data tunneling level, or a transport level.

5. The method according to claim 1, wherein the user plane function is configured on a per protocol data unit session basis by a Session Manager of the Core Network to determine not to use redundant tunnels, and wherein the tunnels are general packet radio service tunneling protocol user data tunnels or transport level tunnels.

6. The method according to claim 1, wherein the method further comprises:
   in a circumstance where traffic redundancy is not needed for the user plane function, requesting the user plane function to not establish redundancy mechanisms.

7. The method of claim 1, further comprising:
   in an instance in which traffic redundancy is not needed for the user plane function, causing the user plane function to not establish redundancy mechanisms.

8. An apparatus comprising processing circuitry and at least one memory including computer program code for one or more programs, the at least one memory and the computer program code configured to, with the processing circuitry, cause the apparatus at least to:
   receive a traffic redundancy indication from a user equipment in a communication network or from a policy controller, wherein the traffic redundancy indication targets a subset of traffic within a protocol data unit session;
   determine whether traffic redundancy is needed for a radio access network and a user plane function based on the traffic redundancy indication; and
   in a circumstance where traffic redundancy is not needed for the radio access network, request the radio access network to not establish redundancy mechanisms.

9. The apparatus according to claim 8, wherein the traffic redundancy indication is part of the protocol data unit session establishment request received from the user equipment.

10. The apparatus according to claim 8, wherein the traffic redundancy indication is part of a protocol data unit session modification request from the user equipment.

11. The apparatus according to claim 8, wherein the radio access network is configured on a per protocol data unit session basis by a Core Network to determine not to perform redundant transmission at: a Packet Data Convergence Protocol level, a general packet radio service tunneling protocol user data tunneling level, or a transport level.

12. The apparatus according to claim 8, wherein the user plane function is configured on a per protocol data unit session basis by a Session Manager of the Core Network to determine not to use redundant tunnels, and wherein the tunnels are general packet radio service tunneling protocol user data tunnels or transport level tunnels.

13. The apparatus according to claim 8, wherein the at least one memory and the computer program code are further configured to, with the processing circuitry, cause the apparatus at least to:
in a circumstance where traffic redundancy is not needed for the user plane function, request the user plane function to not establish redundancy mechanisms.

14. A method comprising:
transmitting a traffic redundancy indication to a core network, wherein the traffic redundancy indication targets a subset of traffic within a protocol data unit session;
determining, by the core network, whether traffic redundancy is needed for a radio access network and a user plane function based on the traffic redundancy indication; and
in a circumstance where traffic redundancy is not needed for the radio access network, requesting the radio access network to not establish redundancy mechanisms.

15. The method according to claim 14, wherein the traffic redundancy indication is part of the protocol data unit session establishment request received from a user equipment.

16. The method according to claim 14, wherein the traffic redundancy indication is part of a protocol data unit session modification request from a user equipment.

17. The method of claim 14, wherein the radio access network is configured on a per protocol data unit session basis by the core network to determine not to perform redundant transmission at: a packet data convergence protocol level, a general packet radio service tunneling protocol user data tunneling level, or a transport level.

18. The method of claim 14, wherein the user plane function is configured on a per protocol data unit session basis by a session manager of the core network to determine not to use redundant tunnels, and wherein the tunnels are general packet radio service tunneling protocol user data tunnels or transport level tunnels.

* * * * *